United States Patent
Chuang

(10) Patent No.: US 8,377,173 B2
(45) Date of Patent: Feb. 19, 2013

(54) AMINE ABSORBER FOR CARBON DIOXIDE CAPTURE AND PROCESSES FOR MAKING AND USING THE SAME

(75) Inventor: Steven Chuang, Hudson, OH (US)

(73) Assignee: The University of Akron, Akron, OH (US)

(*) Notice: Subject to any disclaimer, the term of this patent is extended or adjusted under 35 U.S.C. 154(b) by 289 days.

(21) Appl. No.: 12/741,600

(22) PCT Filed: Nov. 7, 2008

(86) PCT No.: PCT/US2008/012570
§ 371 (c)(1),
(2), (4) Date: Jul. 2, 2010

(87) PCT Pub. No.: WO2009/061470
PCT Pub. Date: May 14, 2009

(65) Prior Publication Data
US 2010/0263534 A1    Oct. 21, 2010

Related U.S. Application Data

(60) Provisional application No. 60/986,355, filed on Nov. 8, 2007.

(51) Int. Cl.
*B01J 20/30* (2006.01)
*B01D 53/04* (2006.01)

(52) U.S. Cl. ....... 95/135; 95/139; 423/230; 423/244.02; 423/228

(58) Field of Classification Search .......... 95/108, 95/112, 135–137, 139, 900; 96/153, 154; 423/230, 244.01–244.04, 228; 502/417, 502/539
See application file for complete search history.

(56) References Cited

U.S. PATENT DOCUMENTS

| | | | |
|---|---|---|---|
| 3,619,130 A * | 11/1971 | Ventriglio et al. | 95/115 |
| 3,627,478 A | 12/1971 | Tepper | |
| 4,100,257 A | 7/1978 | Sartori | |
| 4,112,185 A | 9/1978 | Francois | |
| 4,822,383 A * | 4/1989 | Brose et al. | 95/105 |
| 4,999,175 A * | 3/1991 | Vansant et al. | 423/242.7 |
| 5,087,597 A | 2/1992 | Leal et al. | |
| 5,376,614 A | 12/1994 | Birbara et al. | |
| 5,876,488 A | 3/1999 | Birbara et al. | |
| 5,917,136 A | 6/1999 | Gaffney et al. | |
| 6,908,497 B1 * | 6/2005 | Sirwardane | 95/136 |
| 7,022,168 B2 | 4/2006 | Schmikat et al. | |
| 7,198,768 B2 * | 4/2007 | Carre et al. | 423/220 |
| 7,288,136 B1 | 10/2007 | Gray | |
| 7,527,677 B2 * | 5/2009 | Saito et al. | 96/153 |
| 2008/0072761 A1 * | 3/2008 | Carre et al. | 96/154 |
| 2008/0293976 A1 | 11/2008 | Olah et al. | |

FOREIGN PATENT DOCUMENTS

WO     2006022885        3/2006
WO     WO 2006/094411 A1 *  9/2006

OTHER PUBLICATIONS

Rajesh A. Khatri, et al., "Thermal and Chemical Stability of Regenerable Solid Amine Sorbent for CO2 Capture", Energy & Fuels, 2006, 20, pp. 1514-1520.
Rajesh A. Khatri, et al., "Carbon Dioxide Capture by Diamine-Grafted SBA-15: A Combined Fourier Transform Infrared and Mass Spectrometry Study", Ind. Eng. Chem. Res., 2005, 44, pp. 3702-3708.
M.L. Gray, et al., "Performance of Immobilized Tertiary Amine Solid Sorbents For the Capture of Carbon Dioxide", Intl. Journal of Greenhouse Gas Controls 2, 2008, pp. 3-8.
Seungmoon Lee, et al., "Screening Test of Solid Amine Sorbents for CO2 Capture", Ind. Eng. Chem. Res., 2008, 47, 7419-7423.
Chuang, S., "Metal Monolithic Amine-Grafted Zeolites for CO2 Capture", U.S. Department of Energy, Aug. 1, 2007. http://www.netl.doe.gov/publications/factsheets/project/Proj467.pdf.
Khatri et al., "Thermal and Chemical Stability of Regenerable Solid Amine Sorbent for CO2 Capture", Energy & Fuels, vol. 20, No. 4, Oct. 6, 2006, pp. 1514-1520.

* cited by examiner

*Primary Examiner* — Frank Lawrence, Jr.
(74) *Attorney, Agent, or Firm* — Renner Kenner Greive Bobak Taylor & Weber

(57) ABSTRACT

The present invention generally relates to a process for the formation of a $CO_2$-selective absorption material and/or sulfur-selective absorption material. In one embodiment, the present invention relates to a process for the formation of a $CO_2$-selective absorption material that comprises providing a solid material, providing an amine source, contacting the solid material with the amine source to absorb amine molecules on the surface of the solid material, and contacting the absorbing amine molecules on the solid material surface with a $CO_2$ stream such that upon contact with the amine and the solid material, $CO_2$ binds with the amine functional group of the amine molecule, reducing the potential for the interaction of the amine functional group with the solid surface and increasing amine sites available for $CO_2$ capture.

28 Claims, 8 Drawing Sheets

Experimental Apparatus for Solid Sorbent Characterization

TEPA/SiO$_2$ sorbent in flowing Ar at 50°C

TPD profiles of TEPA/SiO$_2$ prepared from flowing Ar

The amount of $CO_2$ capture for the sorbents prepared in flowing Ar (20% TEPA/EtOH, pretreating with ethanol, and flowing $CO_2$ (*i.e.*, $CO_2$ pretreated).

DRIFTS spectra of TEPA/SiO$_2$ prepared in flowing CO$_2$

A device for the manufacture of the solid sorbent for CO₂ capture

A dual column CO₂ adsorber

AMINE ABSORBER FOR CARBON DIOXIDE CAPTURE AND PROCESSES FOR MAKING AND USING THE SAME

FIELD OF THE INVENTION

The present invention generally relates to a process for the formation of a $CO_2$-selective absorption material and/or sulfur-selective absorption material. In one embodiment, the present invention relates to a process for the formation of a $CO_2$-selective absorption material that comprises providing a solid material, providing an amine source, contacting the solid material with the amine source to absorb amine molecules on the surface of the solid material, and contacting the absorbing amine molecules on the solid material surface with a $CO_2$ stream such that upon contact with the amine and the solid material, $CO_2$ binds with the amine functional group of the amine molecule, reducing the potential for the interaction of the amine functional group with the solid surface and increasing amine sites available for $CO_2$ capture.

BACKGROUND OF THE INVENTION

The invention relates to a novel $CO_2$ sorbent material. More particularly, the invention relates to a novel $CO_2$ sorbent, to a method of making the novel sorbent material, and further to a process for using the same.

$CO_2$ absorbers allow for the capture of $CO_2$ from $CO_2$-containing streams, and then concentrating the effluent to a nearly 99.9% $CO_2$ stream. $CO_2$ capture is important given that exposure to carbon dioxide partial pressures exceeding about 7.6 mm Hg, at partial pressure of about 1%, for extended periods of time are known to cause health problems in humans and other mammals. As a result, in enclosed habitable environments such as those existing in a submarine, space craft or space suit, for example, carbon dioxide partial pressures are typically maintained below about 1% via the use of solid regenerable and nonregenerable carbon dioxide sorbents such as soda lime, zeolite and carbon molecular sieves, solid oxides, alkali metal carbonates, alkali metal hydroxides, amines and combinations thereof.

These solid regenerable carbon dioxide sorbents have also been considered for capturing $CO_2$ from the flue gas of coal-fired power plants. At present, the quantity of $CO_2$ emitted from coal-fired power plants accounts for more than 36% of total global $CO_2$ emission and represents the largest stationary $CO_2$ emission source. Depending on the combustion conditions and the type of coal used, the volume fractions of $CO_2$ in flue gas ranges from 10 to 15%. The development of a cost-effective approach to remove $CO_2$ from the flue gas of coal-fired power plants has been adopted as one of the short term strategies in stabilizing the atmospheric $CO_2$ concentration.

In addition to these sorbents, amines such as monoethanolamine and diethanoamine are often used in a liquid phase to reduce carbon dioxide partial pressures via absorption. These amines are utilized in the aqueous phase, typically at a concentration of 25 wt. % to 30 wt. % amine. In known capture systems, the amine solution enters the top of an absorption tower while the $CO_2$ containing gaseous stream is introduced into the bottom of the tower. While intimately contacting the gaseous stream in a counter-current fashion, the amine solution chemically reacts with the carbon dioxide to absorb and remove the carbon dioxide from the gaseous stream. Desorption of the absorbed carbon dioxide then proceeds via a thermal regeneration process at temperatures in excess of about 150° F. (about 66° C.). During desorption, carbon dioxide and water evolve from the amine solution and are separated by condensing the water vapor in a heat exchanger. Once regenerated, the amine solution is recycled back to the absorption tower for additional carbon dioxide absorption.

Unfortunately however, while amine solutions are capable of initially removing carbon dioxide to partial pressures below about 1%, they have a limited life due to degradation through oxidation of the amine. Oxygen present in the gas stream oxidizes the amine, particularly at the elevated temperatures during desorption when the amine solution is heated. This oxidation tends to reduce the amount of amine primary and secondary functional groups available for carbon dioxide absorption. Consequently, the amine solution's useful life is limited to only about six months of continuous use.

If desorption is accomplished at ambient temperatures, the useful life of the amine solution may be extended, however performance will be limited by low desorption rates. Due to both energy requirements and oxidation related degradation, amine sorbents utilized in closed environment systems are often regenerated at approximately ambient temperatures for a fixed desorption time. At ambient temperatures, the desorption of carbon dioxide is often limiting, taking many hours to complete a full desorption which most systems and uses cannot afford. Under conditions, at which full desorption is not achieved, a portion of the absorbed carbon dioxide remains in the sorbent after the desorption process is halted, thereby reducing the capacity of the sorbent to absorb additional carbon dioxide through a subsequent cycle.

U.S. Pat. No. 5,376,614 discloses a solid aminepolyol sorbent comprising about 1 weight percent to about 25 weight percent amine, about 1 weight percent to about 25 weight percent polyol, and the remainder being a porous support which provides the amine with structural integrity and a high surface area for gas/solid contact. While the solid amine sorbent disclosed in this reference provides a number of advantages over the previously described solid and liquid sorbents, increased concentration of amine in the sorbent and improvements in cyclic $CO_2$ removal capacity are still needed to optimize system performance. In addition, formation of the sorbent in the '614 process is a fairly complex, requiring either pre-forming an amine/polyol solution and then impregnating the support with this solution, or impregnating the support with an amine solution followed by a second impregnation of the support with a polyol solution.

SUMMARY OF THE INVENTION

The present invention generally relates to a process for the formation of a $CO_2$-selective absorption material and/or sulfur-selective absorption material. In one embodiment, the present invention relates to a process for the formation of a $CO_2$-selective absorption material that comprises providing a solid material, providing an amine source, contacting the solid material with the amine source to absorb amine molecules on the surface of the solid material, and contacting the absorbing amine molecules on the solid material surface with a $CO_2$ stream such that upon contact with the amine and the solid material, $CO_2$ binds with the amine functional group of the amine molecule, reducing the potential for the interaction of the amine functional group with the solid surface and increasing amine sites available for $CO_2$ capture.

In one embodiment, the present invention relates to a process for the formation of a $CO_2$-selective absorption material, the process comprising: providing a solid material, providing an amine source, contacting the solid material with the amine source to absorb amine molecules on the surface of the solid material, and contacting the absorbing amine molecules on the solid material surface with a $CO_2$ stream such that upon contact with the amine and the solid material, $CO_2$ binds with the amine functional group of the amine molecule, reducing the potential for the interaction of the amine functional group with the solid surface and increasing amine sites available for $CO_2$ capture.

In another embodiment, the present invention relates to a process for the preparation of a sulfur-selective absorption material, the process comprising: providing a solid material, providing an amine source, contacting the solid material with the amine source to absorb amine molecules on the surface of the solid material, and contacting the absorbing amine molecules on the solid material surface with a sulfur containing stream such that upon contact with the amine and the solid material, the sulfur containing material binds with the amine functional group of the amine molecule, reducing the potential for the interaction of the amine functional group with the solid surface and increasing amine sites available for the sulfur containing material capture.

In still another embodiment, the present invention further provides a $CO_2$-selective absorber comprising an solid material having sorbed on the surface thereof amine molecules capable of selectively capturing $CO_2$ from a $CO_2$-containing stream, such that at least 3 m mol/g of available sorption sites on the oxide material capture 99% of the $CO_2$ molecules in the $CO_2$-containing stream.

In still yet another embodiment, the present invention further provides a process for the capture and removal of $CO_2$ from a $CO_2$-containing stream the process comprising: providing a housing having dispersed therein a sorbent selective for $CO_2$, passing a $CO_2$-containing stream through the housing such that the $CO_2$-containing stream contacts the sorbent, flushing the housing with steam to cause the sorbent to desorb an $CO_2$ retained therein as a result of contact of the sorbent with the $CO_2$-containing stream, and flushing the housing with air to remove the steam from the housing.

These and other aspects of the invention will become apparent to one skilled in the relevant art upon reading and understanding the following disclosure.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

Figure 1:
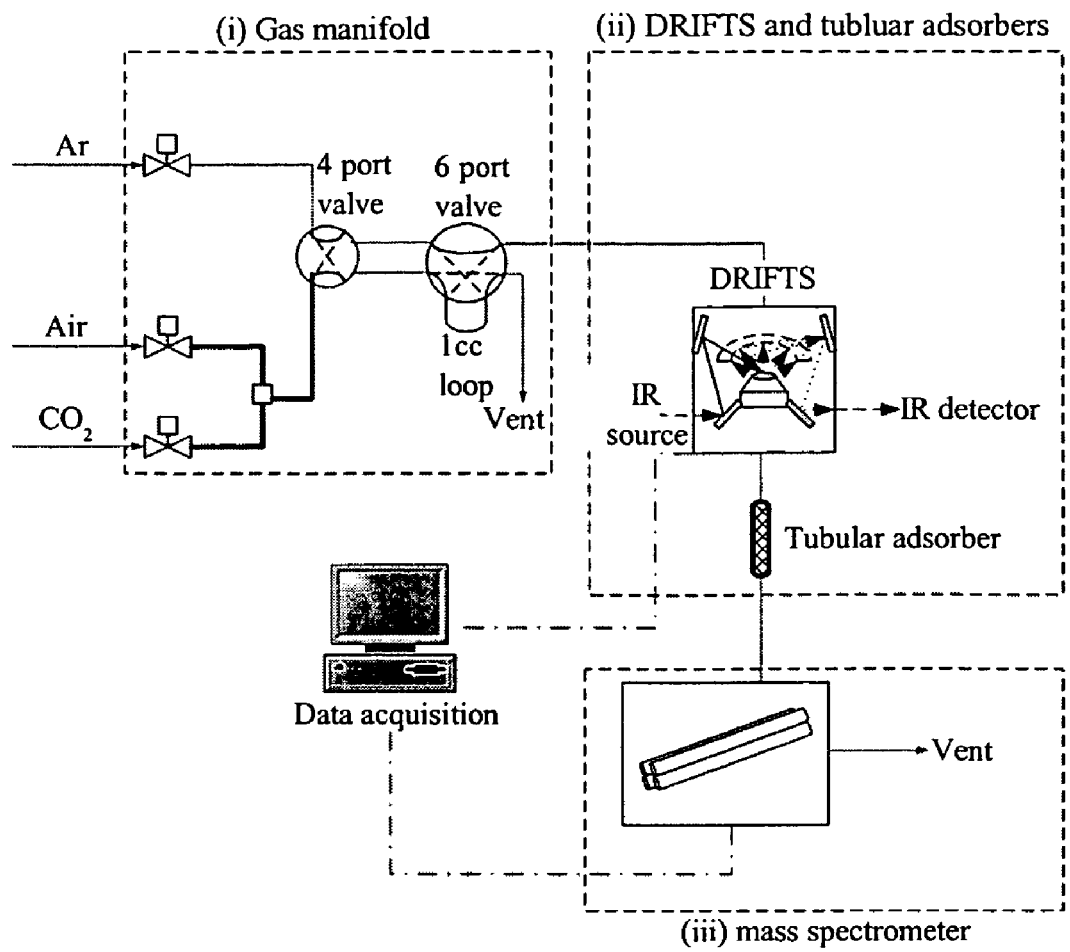
FIG. 1 provides a drawing of the experimental apparatus for solid sorbent characterization.

The present invention generally relates to a process for the formation of a $CO_2$-selective absorption material and/or sulfur-selective absorption material. In one embodiment, the present invention relates to a process for the formation of a $CO_2$-selective absorption material that comprises providing a solid material, providing an amine source, contacting the solid material with the amine source to absorb amine molecules on the surface of the solid material, and contacting the absorbing amine molecules on the solid material surface with a $CO_2$ stream such that upon contact with the amine and the solid material, $CO_2$ binds with the amine functional group of the amine molecule, reducing the potential for the interaction of the amine functional group with the solid surface and increasing amine sites available for $CO_2$ capture.

In another embodiment, the invention also provides a process for the preparation of a sulfur containing selective absorption material, the process comprising: providing a solid material, providing an amine source, contacting the solid material with the amine source to absorb amine molecules on the surface of the solid material, and contacting the absorbing amine molecules on the solid material surface with a sulfur containing stream such that upon contact with the amine and the solid material, the sulfur containing material binds with the amine functional group of the amine molecule, reducing the potential for the interaction of the amine functional group with the solid surface and increasing amine sites available for the sulfur containing material capture.

In still another embodiment, the invention further provides a $CO_2$-selective absorber comprising a solid material having absorbed on the surface thereof amine molecules capable of selectively capturing $CO_2$ from a $CO_2$-containing stream, such that at least 3 m mol/g of available sorption sites on the oxide material capture 99% of the $CO_2$ molecules in the $CO_2$-containing stream.

In still yet another embodiment, the invention provides a process for the capture and removal of $CO_2$ from a $CO_2$-containing stream the process comprising providing a housing having dispersed therein a sorbent selective for $CO_2$, passing a $CO_2$-containing stream through the housing such that the $CO_2$-containing stream contacts the sorbent, flushing the housing with steam to cause the sorbent to desorb an $CO_2$ retained therein as a result of contact of the sorbent with the $CO_2$-containing stream, and flushing the housing with air to remove the steam from the housing.

Methods of Making $CO_2$ Absorber Material:

One method to generate a $CO_2$ absorbing material in accordance with the present invention involves the use of a zeolite or similar high surface area oxide material. In this embodiment, the zeolite or other high surface area oxide is first heated at high temperatures to drive off any residual moisture present in the material. Next, an amine source is added to the zeolite or other oxide and the resulting mixture is stirred for an extended period of time, for example up to 24 or more hours, and then dried. The resulting material is a high surface area oxide capable of capturing and absorbing carbon dioxide.

In another embodiment, an oxide material, similar to and/or including a zeolite, is contacted with an amine source, at room temperature, the combination is mixed and then subjected to continuous stirring, for an extended period of time, for example up to about 24 or more hours, and then dried. This is similar to the previous method, but lacks the step of heating the oxide material to drive off residual moisture. As with the previous method, the resulting material is a high surface area oxide capable of capturing and absorbing carbon dioxide.

In yet another embodiment of the invention, a zeolite or other high surface area oxide material is loaded into a container having multiple inlets, and having a mechanism whereby the high surface area material is contacted by an amine source charged to the interior of the container through at least one inlet or opening, and is contacted by a stream of carbon dioxide gas charged to the interior of the container through at least one other inlet or opening. In one embodiment, the container includes a screen or mesh-type material, positioned within the container such that it supports the high surface area material. In this embodiment, the amine source is added to the container from an inlet or opening above the oxide material, such that the amine source is charged drop-wise to the container and falls onto the high surface area oxide. Simultaneously, a stream of carbon dioxide gas is charged to the container through a lower inlet or opening, such that the stream contacts the oxide material from below. Of course, any configuration of inlets may be employed so long as both amine and carbon dioxide contact the oxide material. The foregoing better serves this purpose when the amine source is a liquid and the carbon dioxide stream is in the form of a gas.

In still another embodiment, the amine source is mixed with an appropriate solvent, such as ethanol and, and added to the container in small increments. Because ethanol evaporates at room temperature, the amine/ethanol solution is allowed to infiltrate the pores of the high surface area oxide, and the ethanol quickly evaporates off, before adding further amine solution. The addition of too much amine solution at one time results in agglomeration of the amine molecules which is not desirable for this purpose. By adding the amine source in smaller increments, for example drop-wise on a bench scale model of the apparatus used, the surface of the oxide is more completely infiltrated with amine, increasing the capturing capacity of the resulting absorbent with regard to the capture of carbon dioxide.

Other suitable solvents include, but are not limited to, polyethylene glycol, propanol, butanol, or mixtures of two or more thereof. Other alcohols can be used as a solvent with some alcohols having a boiling point below about 135° C. and evaporating off prior to $CO_2$ capture. In other instances the alcohol has a boiling point above about 135° C. and remains on the sorbent to enhance (or increase) $CO_2$ capture.

The amine source may be any secondary or higher amine, for example, tetraethylene penta amine (TEPA). Other suitable amine sources include, but are not limited to, aliphatic, paraffinic amines, aromatic amines, or suitable combinations of two or more thereof. In addition, any suitable solvent may be used, including, but not limited to, various alcohols. Non-limiting examples of solvents include, but are not limited to, polypol, polyethylene glycol, propanol, butanol, ethanol, monoethanolamine, diethanolamine, or suitable mixtures of two or more thereof.

In one embodiment, when utilizing alcohol as a solvent, the solvent contains an alcohol with one hydroxyl group and an alcohol with multiple hydroxyl groups. Suitable amines must be easily dispersed over the high surface area of the porous oxide, but be retained on the surface thereof such that the hydrogen atoms of the amine molecule are available to interact with the oxygen atoms from a carbon dioxide source, thus capturing and absorbing the same. Depending on the amine source and the solvent, the concentration of amine molecules therein should be sufficient to effectively cover the oxide surface. For example, when using a solution of TEPA and ethanol, the amine concentration should be about 15%, and in other embodiments is about 20%, and in still other embodiments about 30%. At lower concentrations, the amine molecules do not effectively cover the oxide surface for optimum carbon dioxide capture.

Table 1 details various capture capacities of silica supported amines with various solvents. Additional detail regarding $CO_2$ capture and setups regarding same can be found below.

TABLE 1

$CO_2$ Capture Capacity of 1 Gram of Silica-Supported Amines with Polyethylene Glycol and Monoethanolamine

| AMINE | SOLVENT | BOILING POINT | CAPTURE ($\mu$mol/g) |
|---|---|---|---|
| 1.6 ml Tetraethylenepentamine | 6.4 ml ethano | 78.5° C. | 6,200 |
| 1.6 ml Tetraethylenepentamine | 8 ml Ethanol 0.4 ml polyethylene glycol | 78.5° C. above 180° C. | 7.300 |
| 1.6 ml Tetraethylenepentamine | 8 ml Ethanol 0.4 ml monoethanolamine | 78.5° C. 170° C. | 7.300 8,200 |
| 1.6 ml Pentaethylenehexaamine | 6.4 ml ethanol | 78.5° C. | 4,600 |

$CO_2$ Sorbent:

In one embodiment of the invention, the sorbent comprises an oxide having disposed on the surface thereof amine molecules. This sorbent is capable of capturing $CO_2$ from a carbon dioxide-containing stream and then releasing the captured $CO_2$ and separating the released $CO_2$ to generate a substantially pure $CO_2$ product and a carrier stream. Suitable high surface area materials include carbon-containing fly ash, activated carbon, silica, such as zeolites, and iron powder, among others.

The high surface area, amine-impregnated solid sorbent produced according to the method of the invention can be characterized using a DRIFTS spectra. The experimental apparatus for characterizing the solid sorbent, shown in FIG. 1, consists of (i) a gas manifold comprising three mass flow controllers, a 4-port valve, and a 6-port valve, (ii) a DRIFTS cell (Thermo Scientific) filled with 20 to 150 mg of sorbent was placed in a Nicolet 6700 FT-IR bench followed by a heated tubular adsorber with 0.5 grams of sorbent and (iii) a Pfeiffer QMS 200 quadrupole mass spectrometer (MS) for measuring the effluent composition of the adsorbers. DRIFTS single beam spectrum of the sorbent contains characteristics of the source and sample placed in the path of the IR beam, resembling a transmission spectrum.

Figure 2:
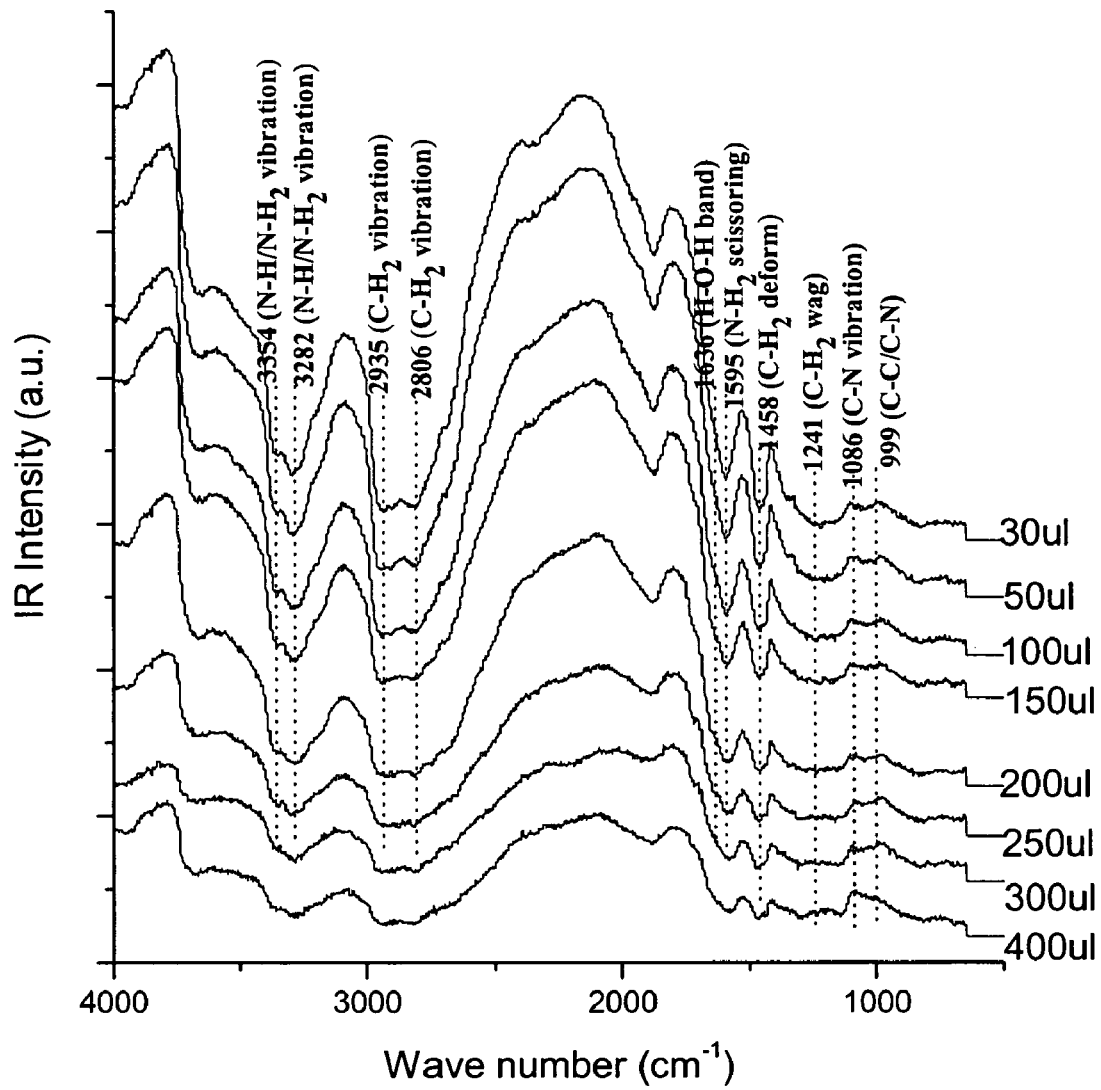
FIG. 2 is a DRIFTS spectra of the TEPA/$SiO_2$ sorbent prepared by TEPA/$SiO_2$ sorbent in flowing Ar at 50° C.

Sorbent materials formulated according to the foregoing procedure, using an amine source and a carbon dioxide stream to load the solid sorbent with available amine interaction cites, when subject to DRIFTS, exhibit a characteristic peak at 3200 to 3400 cm$^{-1}$. FIG. 2 shows the DRIFTS spectra of the TEPA (tetraethylenepentamine)/$SiO_2$ sorbent prepared by the addition of the specific quantity of 20 percent by volume TEPA/80 percent by volume ethanol solution to 20 mg of $SiO_2$ in flowing argon at 150 cc/min at 50° C. and then heating from 50° C. to 135° C. $SiO_2$ (TIXOSIL 68B from Rhodia) used in this example has a surface area of 127 $m^2/g$ and a pore volume of 1.05 cc/g. Ethanol is used with TEPA for dispersing the TEPA molecules on the surface $SiO_2$. The spectrum labeled with 30 μl indicated that the sorbent was prepared by addition of 30 μl of TEPA/ethanol solution; the spectrum labeled with 50 μl indicated that the sorbent was prepared by the subsequent addition of 20 μl of TEPA/ethanol solution. The $NH_2$ intensity at 3282 and 3354 $cm^{-1}$ serves as an index of the nature of the interaction of its interaction with the $SiO_2$ surface. The strong interaction decreases the intensity of the $NH_2$ bands and decrease the amine site (i.e., $NH_2$ site) for $CO_2$ capture.

$CO_2$ capture was carried out at 50° C. by switching the inlet flow to the DRIFT cell/the tubular adsorber from the inert gas (Ar) to $CO_2$/air (30% $CO_2$ in air) with the 4-port valve. The use of the 4-port valve allows the total flow rate of the inlet stream to be maintained at a steady state during the switching. Following $CO_2$ adsorption on the sorbent beds, the inlet flow was switched from the $CO_2$/Ar stream back to the He stream. Temperature programmed desorption (TPD) was performed by heating the sorbent bed from 30 to 135° C. at a heating rate of 10° C./min holding at 135° C. for 5 minutes under flowing Ar at 150 cc/min. The sorbent bed was then cooled to 30° C. where successive TEPA/ethanol addition, $CO_2$ capture, and TPD were preformed.

Figure 3:
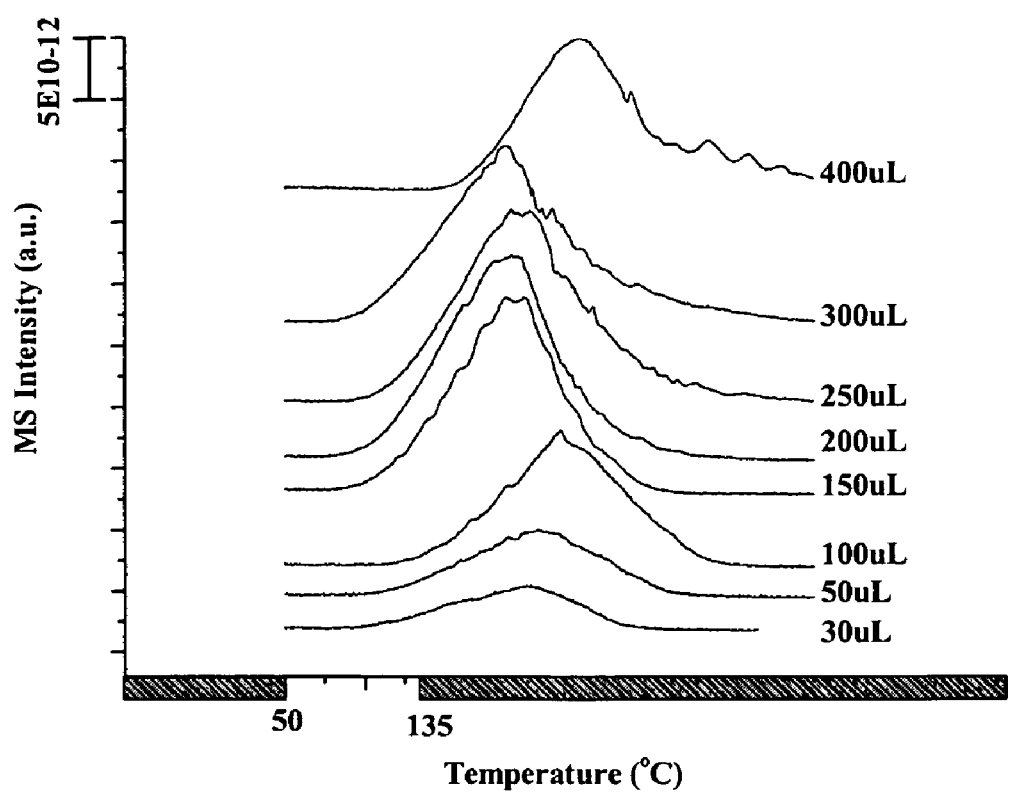
FIG. 3 is a graph of TPD $CO_2$ profiles of the sorbent of which DRIFT spectra.
Figure 4:
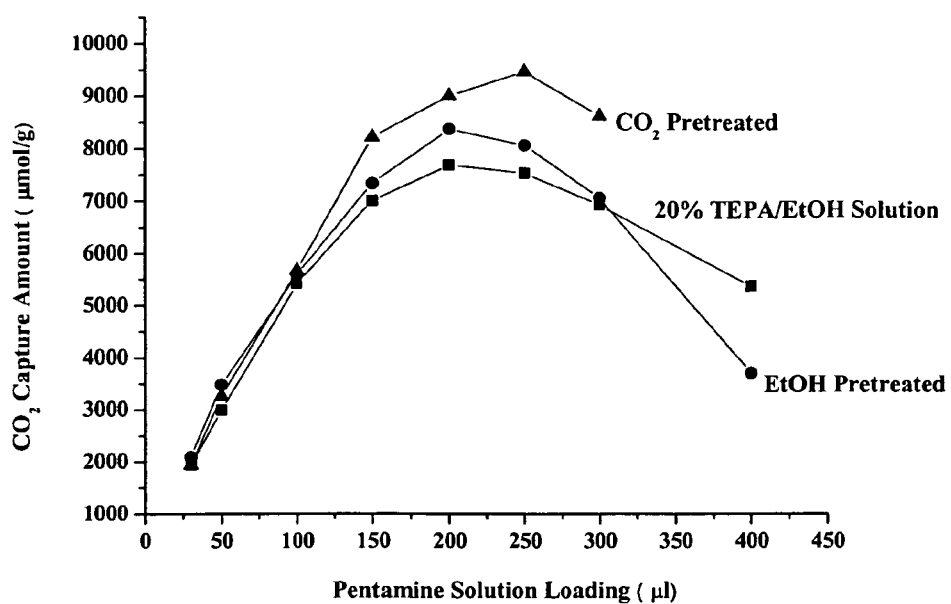
FIG. 4 is a graph detailing the amount of $CO_2$ capture for the sorbents prepared in flowing Ar (20% TEPA/EtOH, pretreating with ethanol, and flowing $CO_2$.

FIG. 3 shows the TPD $CO_2$ profiles of the sorbents of which DRIFTS spectra are shown in FIG. 2. The total amount of $CO_2$ capture is equivalent to the area under the TPD $CO_2$ profile. The calibration of the $CO_2$ profile was carried out by injecting a known amount of $CO_2$ into the 150 cc/min of Ar stream via a 6-port valve and determining the area under the $CO_2$ MS profile. The amount of $CO_2$ capture for the sorbent prepared from 20 percent by volume TEPA/80 percent by volume ethanol solution in flowing Ar is shown as 20 percent TEPA/EtOH solution in FIG. 4.

The largest $CO_2$ quantity of $CO_2$ captured in this example is 7550 μmol/g for loading of 200 μl of TEPA/ethanol solution. Further addition of TEPA/ethanol solution caused a decrease in the quantity of $CO_2$ captured. The reason for decreasing $CO_2$ capture is revealed by the DRIFTS spectra in FIG. 2 which shows that increasing addition of TEPA/ethanol solution beyond 200 μl resulted in a significant decrease in $CO_2$ capture quantity. The $CO_2$ capture quantity can be further improved by (i) ethanol pretreatment and (ii) $CO_2$ pretreatment. Ethanol pretreatment is carried out by the addition of 20 μl of ethanol prior to the addition of TEPA/ethanol solution. Pretreated ethanol fills up the pore of silica and help in dispersing TEPA on the silica surface. $CO_2$ pretreatment is carried out by the addition of TEPA/ethanol solution to $SiO_2$ under flowing $CO_2$.

Figure 5:
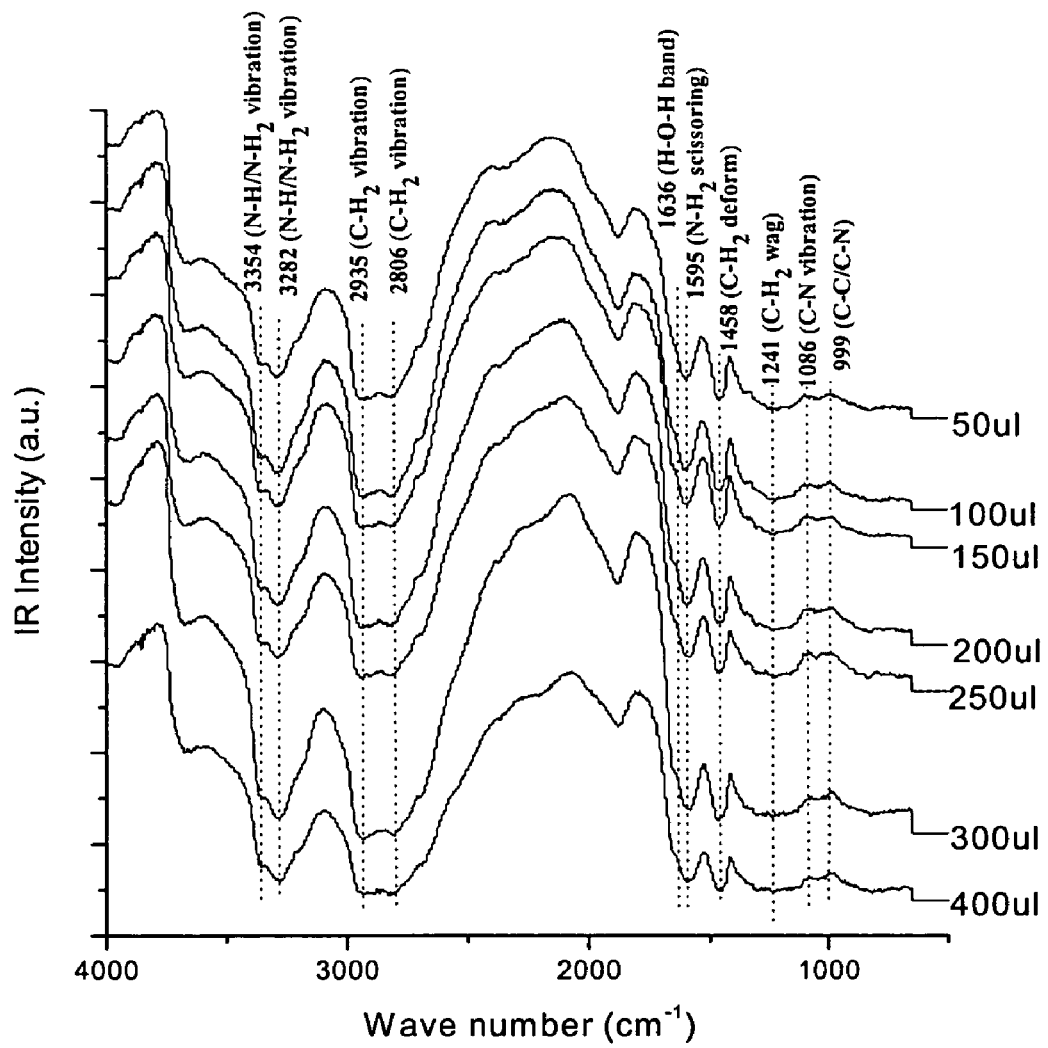
FIG. 5 is a DRIFTS spectra of TEPA/$SiO_2$ prepared in flowing $CO_2$.

Comparison of the single beam spectra in FIG. 5 and those in FIG. 2 shows the $NH_2$ bands of TEPA in flowing $CO_2$ are more intense than their counterpart prepared in flowing Ar.

The intense $NH_2$ bands indicate that $CO_2$ binds with the $NH_2$ group of TEPA during dispersing on the $SiO_2$ surface, preventing these $NH_2$ from interacting with oxygen on the $SiO_2$ surface, thus preserving the $NH_2$ sites on TEPA for $CO_2$ capture.

Figure 6:
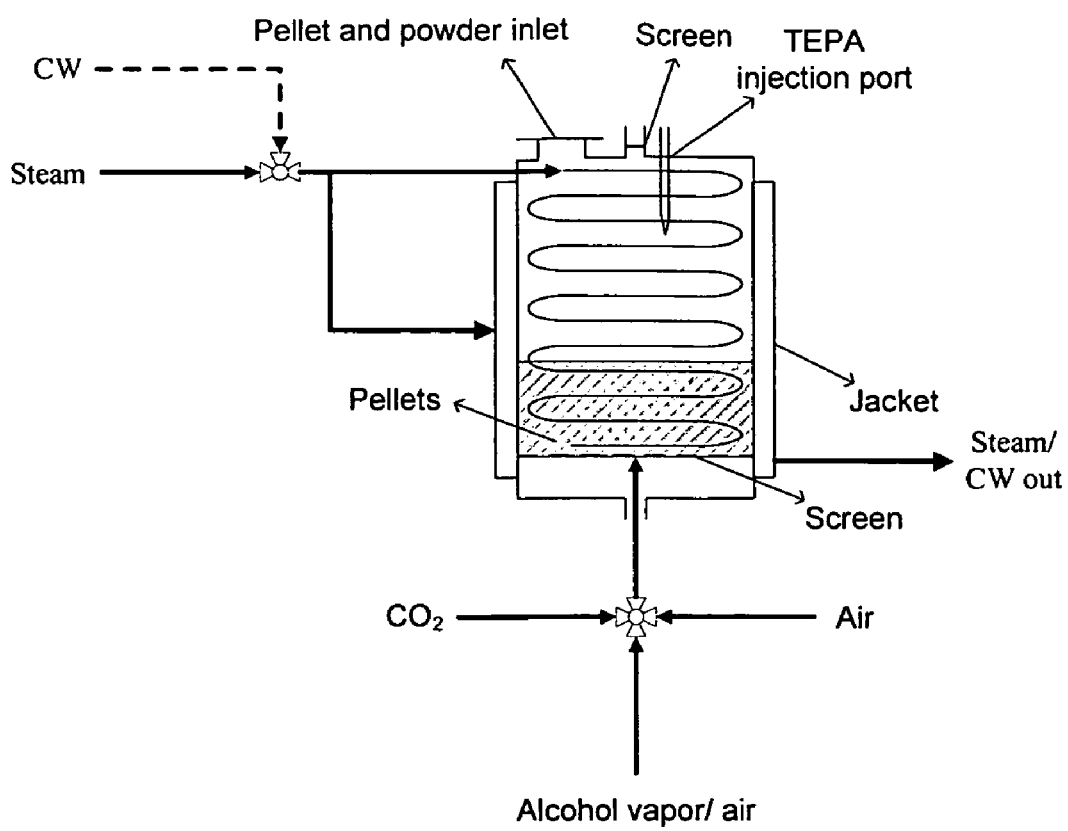
FIG. 6 is a drawing showing a device for the manufacture of the solid sorbent for $CO_2$ capture.

FIG. 6 is a device for the manufacture of the above mentioned high $CO_2$ capture solid sorbent. Porous and non-porous solid materials including, but not limited to silica, steel, zeolite, carbon-containing fly-ash, fly-ash, activated carbon, charcoal, carbonaceous material and iron powder, polymer, steel powder, and oxides such as $SiO_2$ are placed in the chamber of the device where amine/alcohol solution are dropped on these solid materials through TEPA injection port while $CO_2$ are flowing upward. The temperature of the solid is controlled by sending either cooling water or steam to the jacket and coil. Solid material, $CO_2$, and amine/ethanol solution are in contact at 50° C. for a period of time to allow amine to dispersion on the solid surface. Following the distribution of amine on the solid surface, ethanol is removed by heating to 100° C. in flowing $CO_2$.

Both porous and nonporous solid can be used for this invention. Solid material such as $Al_2O_3$ (alumina) is an undesirable material because it is a strong solid acid. The surface of this material becomes polarized positively in an acid medium; the surface becomes polarized negatively in a base medium. Desirable materials include carbon materials, polymer materials, and silica because they contain low concentration of weak acid sites. These materials contain weak acid sites which allow $NH_3$ to desorb at temperatures below 220° C. during $NH_3$ temperature programmed desorption. Using beta-zeolite as example, the low concentration of the acid site is equivalent to beta-zeolite with a Si/Al ratio of 25. Each Al atom introduces an acid site. The materials with low concentration of weak acid sites will allow the $NH_2$ functional group of an amine molecule to capture $CO_2$. The strong acid sites will interact with $NH_2$ functional group, taking away the availability of $NH_2$ to interact and capture $CO_2$. Typical amine functional groups contain N, NH or $NH_2$ with the amine functional group serving as an amine site. Thus, the materials with low concentration of acid site and low basic sites are defined as low polarity materials.

The manufacturing process in FIG. 6 resulted in TEPA/$SiO_2$ with more than 9000 μmol/g. The use of other methods results in low $CO_2$ capture capacity as shown in Table 2.

TABLE 2

$CO_2$ Adsorption Capacity of Each Sorbent, Initial Desorption Temperature, Peak Desorption Temperature, and Surface Area of the Support Without TEPA

| Sorbent support | Run 1 (μmol/ g-sorbent) | Run 2 (μmol/ g-sorbent) | Initial desorption temperature | Peak desorption temperature | Support surface area ($m^2$/g) |
|---|---|---|---|---|---|
| TEPA/$Al_2O_3$ | 102 | 74 | 95 | 125 | 225 |
| TEPA/$SiO_2$ | 418 | 397 | 85 | 135 | 180 |
| TEPA/Beta Zeolite | 824 | 817 | 55 | 104 | 680 |

The solid sorbents listed in Table 2 are prepared by the following methods. Two grams of beta zeolite (Zeolyst CP814E), used as a support for TEPA, were pretreated in flowing $N_2$ at 400° C. for 24 hours in a quartz tube. This zeolite was selected for its high pore volume and surface area. The heated beta zeolite was mixed with 25 mL of TEPA (Sigma Aldrich) in a 250 mL beaker at 150° C. to form a slurry. The slurry was stirred at 90 RPM for 24 hours at 150° C., washed with ethanol, vacuum-filtered, and passed through a 100 mesh sieve. The resultant TEPA/beta zeolite sorbent exhibited a pale yellow color. TEPA/Al$_2$O$_3$ was prepared using the same procedure; however, the higher density of Al$_2$O$_3$ allowed 4.0 grams to be placed in the quartz heating tube. The density of beta zeolite, Al$_2$O$_3$, and SiO$_2$ are 1.5, 3.97, and 2.2 g/cc, respectively. TEPA/SiO$_2$ was prepared by mixing 2.0 grams of heated SiO$_2$ with 0.4 grams of TEPA and 25 mL of ethanol at 75° C. Ethanol prevented the congealing of TEPA with SiO$_2$ into several lumps. Congealing only occurred when mixing pure TEPA with SiO$_2$.

In summary, the method shown in FIG. 6 produced the sorbent with significant higher CO$_2$ capacity than recent results.

CO$_2$ Capture and Absorption Method:

Using a sorbent denoted as Sorbent C, an apparatus was prepared for conducting a cyclic sorption/desorption process for the capture and recovery of substantially pure CO$_2$ from waste and other effluent streams or sources. The method involves disposing a sorbent selective for CO$_2$ within a housing, whereby the CO$_2$-containing source contacts the sorbent resulting in the capture of CO$_2$ by the sorbent. The captured CO$_2$ is then desorbed for recovery.

One of ordinary skill in the art would understand the various configuration for the housing that could be utilized. In one embodiment, the housing is cylindrical, such as but not limited to a pipe or tube, though any container configuration may be used as this is not a limiting feature of the method of the invention. Hereafter, reference to the use of a cylinder or tube shaped housing is understood to include any shape of housing that facilitates use of the method as part of or in conjunction with a particular system or apparatus. Now then, the housing has disposed therein the sorbent selective for CO$_2$. In some embodiments, the sorbent may be disposed within the housing in the form of a packed bed. In other embodiments, the sorbent may be disposed within the housing supported on a screen, mesh or other membrane-type material in the form of a fluidized bed. In still other embodiments, the sorbent may be disposed within the housing as a surface coating covering the interior walls of the channels of a metal monolith. In this latter instance, the channels may be square and arranged so that alternate rows of channels facilitate the flow of a cooling stream to reduce the heat build-up during the cyclic sorption/desorption process. In still other embodiments, the sorbent is disposed within the housing supported on a metal or other material wire.

In one embodiment, the housing/sorbent combination is constructed to receive a stream having entrained therein CO$_2$ to be removed or captured, generally at room temperature to about 60° C., though other stream temperatures may also be accommodated. Generally, for example, the flue gas exiting a power plant is at room temperature, making this system easily adaptable for use with such effluent streams. Further, this temperature range provides the optimal conditions for efficient removal of CO$_2$. At higher temperatures, even at for example 80° C., the absorption rate of CO$_2$ is diminished to about 50%.

In one embodiment, the housing/sorbent system further includes a source of steam, at about 100° C. to about 135° C. The increased temperature of the steam over that of the sorbed CO$_2$ is sufficient to cause the CO$_2$ to desorb. In addition, the steam carries the desorbed CO$_2$ away from the sorbent, preferably to a collection unit.

The collection unit may include a device to concentrate and condense the desorbed CO$_2$ and separate it from the steam, which is also condensed and then recirculated through the system for further use. Once the CO$_2$ has been desorbed in the steam flush, a further flush of cooler, dry air or other appropriate gas is used to flush the steam from the sorbent housing, as it tends to degenerate the sorbent thereby reducing absorption capacity over time.

While the housing and sorbent have been discussed with regard to certain embodiments, it is to be understood that the exact configuration is not a critical limitation. For example, the housing may have more than one inlet for CO$_2$ containing or H$_2$S containing gas or stream, and the housing maybe horizontally disposed or vertically disposed or any variation thereof.

Figure 7:
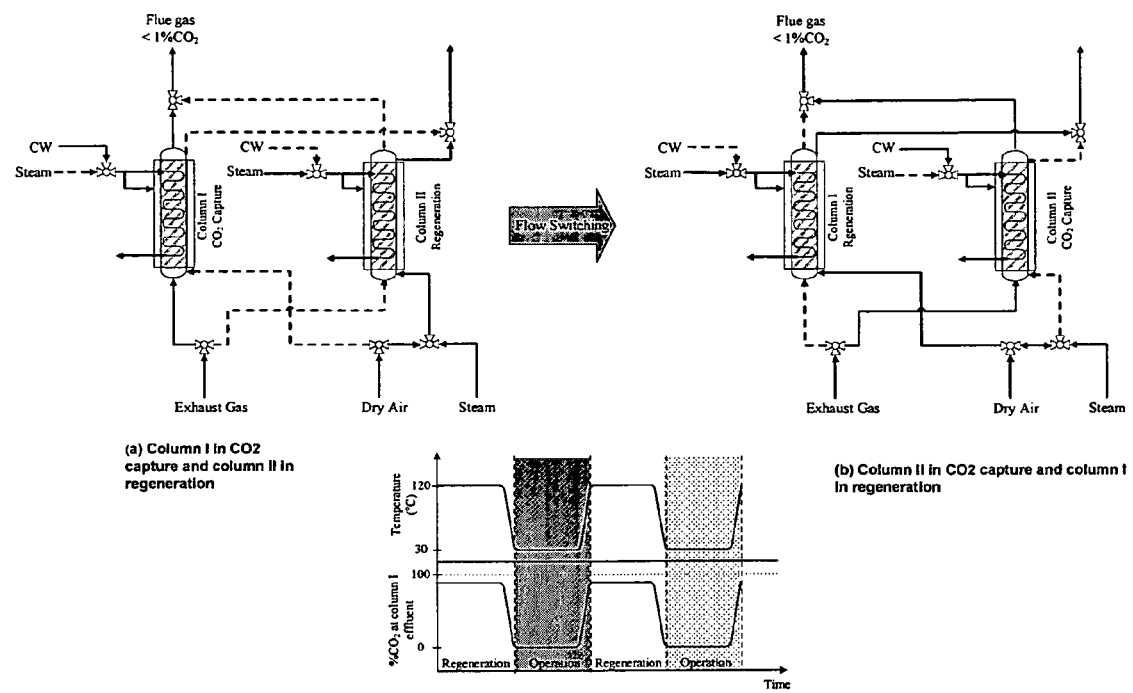
FIG. 7 is a drawing detailing a dual column $CO_2$ adsorber.

FIG. 7 shows the operation of dual column adsorber unit where column I is the process of capturing CO$_2$ and column II is in the process of regeneration. FIG. 7(*a*) shows that shows that a CO$_2$-containing stream enters the column I (i.e., absorption unit) at temperature below 60° C. while the temperature of the entire absorption unit will be kept below 60° C. with either cooling water or cool air. Following saturation of the absorption unit with CO$_2$, CO$_2$ absorbed on the absorption unit is heated with steam (135° C. and 45 psia) to desorb CO$_2$. Desorbed CO$_2$ in the unit is then flushed out to a condenser with the steam and subsequently steam is flushed out the adsorbed unit with heated dry air to remove the steam from the adsorption unit. In summary, the regeneration of sorbent consist of (i) desorption of CO$_2$ with steam, (ii) removal of steam from the unit by heated dry air, and (iii) cooling the unit down to CO$_2$ capture temperature. The dual absorber allows continuous capturing CO$_2$ from the CO$_2$-containing stream without interruption. The number of dual columns needed for the continuous removal of the CO$_2$ from flue gas will depend on the time needed for CO$_2$ adsorption, sorbent regeneration, and cooling of the regenerated column as well as specific CO$_2$ adsorption capacity of sorbent.

Figure 8:
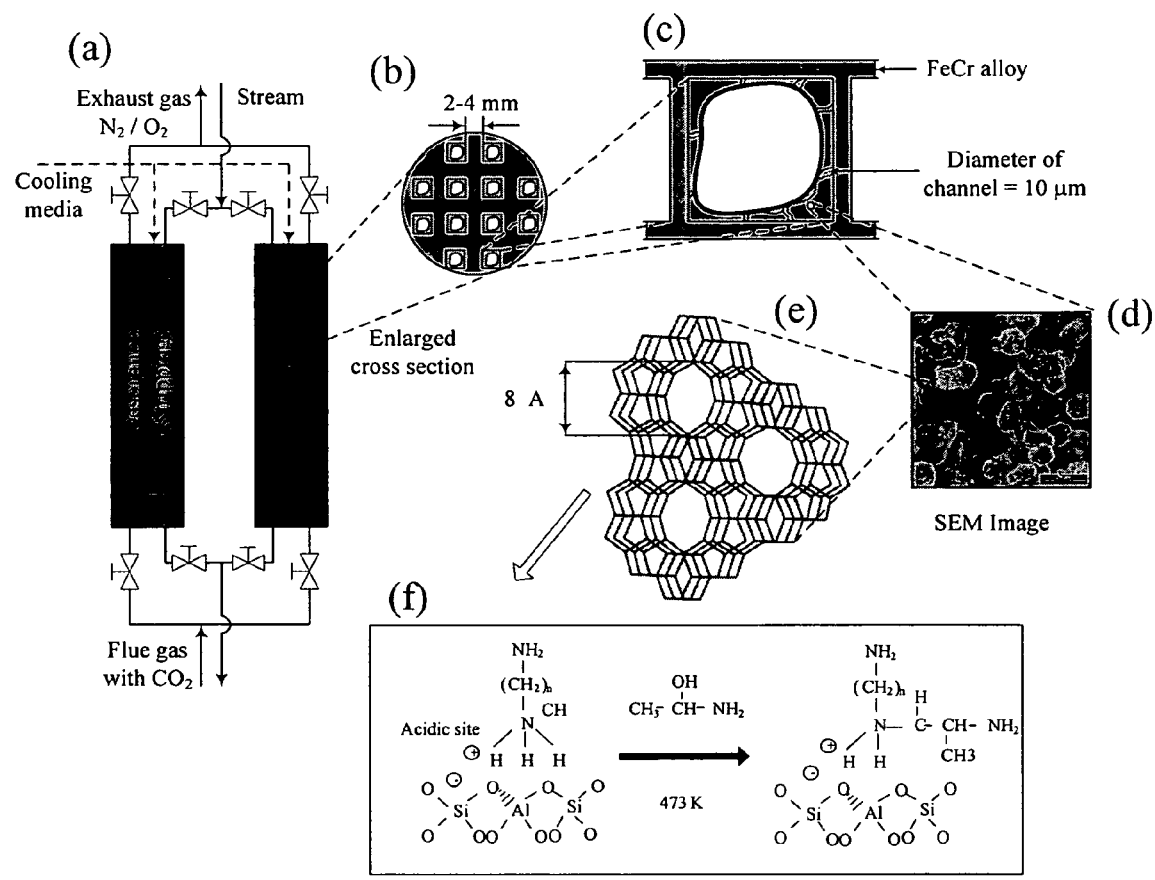
FIG. 8 is a DRIFTS spectra for a silica 68B high surface area support subjected to TEPA/EtOH $CO_2$ pretreatment according to the invention.

As is seen in FIG. 8, the metal monolithic absorber system consists of a dual absorber scheme for CO$_2$ capture and adsorbent regeneration. FIG. 8(*a*) shows that a CO$_2$-containing stream enters the absorption unit at temperature below 60° C. while the temperature of the entire absorption unit will be kept below 60° C. with either cooling water or cool air. Following saturation of the absorption unit with CO$_2$, CO$_2$ absorbed on the absorption unit is desorbed with steam (350° F. and 80 psig) to regenerate the sorbent. The dual absorber allows continuous capturing CO$_2$ from the CO$_2$-containing stream without interruption.

With further reference now to the various housing setups, the wire or mesh used can be coated with a nanostructured/hydrophobic high surface oxide such as zeolite. The amine source, such as TEPA in ethanol, is then disposed on the oxide-coated wire, as discussed previously herein, and the ethanol allowed to evaporate off, leaving only the amine impregnated onto the oxide to form the immobilized amine sorbent.

The absorber consists of metal monoliths with parallel square channels (typically 2 to 4 mm in width) of which surface is coated with a nanostructured/hydrophobic high surface oxide such as zeolite. Amine is impregnated onto the oxide to form the immobilized amine sorbent. The metal monoliths provide low pressure drop and highly efficient heat transfer. The metal monoliths consist of straight channels: one row of channels coated with amine-grated zeolite; one used for heat transfer media for either cooling for adsorption or heating for regeneration. The alternative arrangement of CO$_2$ adsorption and cooling media (i.e., water or air) channels will allow effective removal of adsorption heat. The metal monoliths are made of low cost FeCr alloy foil ($7 per lb from MK metallfolien GmbH, Volmarsteiner strasse 19, Hagen, D-58089) which possesses excellent mechanical strength, corrosion resistance, heat conductivity (16 W m$^{-1}$ K$^{-1}$), and adherence to ceramic binder (Aremco 571). Other metal such aluminum has also been tested and shown the similar properties as FeCr alloy.

Other high surface area oxide materials can be used to immobilize the amines, including those having a high surface area oxide which contains a low concentration of acidic sites. Examples include, but are not limited to, silicates, zeolite, and clay. The acidic sites on these materials can be produced by incorporation of $Al^{+3}$. Low concentration of acidic sites makes the surface of oxide hydrophobic. Low Al/Si ratio zeolites (i.e., ZSM-5 and mordenite) possess (i) low concentration of strong $Al^{+3}$—O—$Si^{+4}$ acidic sites, (ii) hydrophobicity, (iii) hydrothermal stability, and (iv) an uniform cavity and pore size with high specific surface area. These features make these zeolites ideal structures for grafting with amine for $CO_2$ capture. Hydorphobicity is essential to prevent $H_2O$ sorption from blocking the zeolite pore for $CO_2$ diffusion. The acidic site where $H_2O$ would adsorb, will serve as the site for binding diamine and higher amine species, as shown in the insect in FIG. 8(f). The binding energy between amine functional group and Bronsted acid site is greater than 80 Kcal/mol. This binding, which is as strong as the C—C covalent bond, only cracks at temperatures above 250° C. (523 K) at which the C—C bond dissociates. The amine binding approach described in this invention allows the use of very low cost di/tri/tetra/penta amines instead of costly amines with silane functional groups (see Table 3 for the approximate cost of amines).

The large cavity of these zeolites provides sufficient void space to accommodate alkyl and aryl amines. Table 3 list a series of low-cost alky and aryl amine molecules that will be grafted onto the zeolite. These molecules with a length ranging from 4 Å to 10 Å and a diameter of 2.5 Å are able to be positioned in the zeolite cavity. Since amine functional groups provide the specific binding sites for $CO_2$, increasing the number of amine functional groups in the grafted alkyl amine will lead to an increase in $CO_2$ capture capacity.

One approach to increase the hydrophobicity and the number of amine functional group is further amination of the zeolite surface and the grafted-amine with ethanol or ethyl amine at 493 K on the acidic sites of the zeolite.

TABLE 3

Amines for Grafting

| Name | Cost($)/g | Cost($)/mol | Vendor | |
|---|---|---|---|---|
| m-Phenylenediamine | 0.042 | 4.50 | 1 | kg |
| Tetraethylenepentamine | 0.053 | 10.03 | 500 | g |
| Hexamethylenetetramine | 0.01504 | 2.11 | 2.5 | kg |
| Ethanolamine | 0.035 | 2.13 | 16 | l |
| 3-aminopropyl-triethoxysilane (99%) | 0.1218 | 26.96 | 500 | g |
| [N-(2-aminoethyl)-3-aminopropyl]trimethoxysilane | 0.1582 | 35.25 | 500 | g |

The added amine will not only react with the grafted amine but also strongly adsorb on those acidic sites which were not grafted with the high (i.e., di/tri/tetra) amines. Removal of acidic sites on the amine-grafted zeolite will make the zeolite surface completely hydrophobic.

One means of preparation of beta-zeolite-supported pentaamine:

(1) Heat beta-zeolite to 400° C. in an inert environment (i.e., use nitrogen as a purging gas) for 1 day. The purpose of this step is to remove water from zeolite.

(2) Heat penta-amine to 80° C. in an inert environment. The zeolite was dropped in to the amine solution while stirring.

(3) After 1 day, the amine/zeolite temperature was raised to 150° C. High temperature was used to facilitate diffusion of amine into the zeolite cage and dispersion of penta-amine on the surface of zeolite particle. This step allows the amine to be adsorbed (i.e., immobilized) on the zeolite surface and inside of zeolite cage.

(4) After 1 day at 150° C., the amine/zeolite was mixed with ethanol and vacuum filtered. Ethanol is used to remove excess penta-amine which does not adsorb on the surface of zeolite and inside of the zeolite cage.

(5) The filtrate was then washed with ethanol until a dry powder was formed, about 3 washing where needed to obtain a powder (i.e., immobilized amine sorbent).

Thirty milligrams of the above mentioned beta-zeolite supported penta-amine (i.e., immobilized amine sorbent) was placed in an infrared cell and 500 mg of them was placed in a quarter-inch tubular reactor in the downstream of the infrared cell. The immobilized amine sorbent in the infrared cell and tubular reactor was exposed to a stream of 3% $H_2O$ and 10% $CO_2$ in Argon (Ar) at a flow rate of 40 $cm^3$/min. Following $CO_2$ absorption, the immobilized amine was heating at 10° C./min under 40 $cm^3$/min and then holding 120° C./min for 10 min. 907 μmol/g of $CO_2$ was captured by the above mentioned immobilized sorbent. The results demonstrate that this concept works well for capture of $CO_2$.

A metal monolithic $CO_2$ absorber system utilizing the concepts of the present invention offers the advantages of a low pressure drop, a high $CO_2$ absorption capacity, a high $CO_2$ capture efficiency, a low heat of regeneration and a low cost of absorbent.

Theses unique features allows the $CO_2$ absorber to be operated with 15% of regenerated heat as compared with the current state of the art liquid amine $CO_2$ capture system. The construction, operating, and maintenance cost of the metal monolithic $CO_2$ absorber is expected to be significantly lower than that of the liquid amine system due to the use of low cost amine and the absence of liquid transport lines.

The forgoing teaching in referring to the use and capture of $CO_2$ will also cover $H_2S$ and sulfur containing hydrodcarbons such as, but not limited to, mercaptan. All uses and disclosures of $CO_2$ can easily be adapted by one of ordinary skill in the art to cover sulfur containing hydrodcarbons. For this particular use, the $NH_2$ functional group of the amine molecule is a base; the SH functional group of the above sulfur compounds is an acid. The acidity of these sulfur compounds is slightly weaker than the acidity of carbon dioxide (i.e., $CO_2$). Thus, our sorbent can capture both $CO_2$ and sulfur compounds. Our sorbent can be regenerated at 100 to 135° C. for $CO_2$ capture and e regenerated at 85 to 120° C. for sulfur compound capture. Examples of suitable sulfur containing hydrocarbons include, but are not limited to hydrogen sulfide ($H_2$), carbonyl sulfide (COS), $CS_2$, thiophene, dibenzothiophene, tetrahydrothiophene (THT), dimethyl sulfide (DMS), mercaptan, tert-butylmercaptan (TBM), 2-methyl-2-propanethiol, 1-propanethiol, Isobutanethiol, 2-butanethiol, 1-butanethiol, 1-pentanethiol, 1-hexanethiol, and 1-heptanethiol.

Although the invention has been described in detail with reference to particular examples and embodiments, the examples and embodiments contained herein are merely illustrative and are not an exhaustive list. Variations and modifications of the present invention will readily occur to those skilled in the art. The present invention includes all such modifications and equivalents.

What is claimed is:

1. A process for the preparation of a $CO_2$-selective absorption material, the process comprising:

providing a solid material;

providing an amine source;

contacting the solid material with the amine source to absorb amine molecules on the surface of the solid material; and contacting the absorbing amine molecules on the solid material surface with a $CO_2$ stream such that upon contact with the amine and the solid material, $CO_2$ binds with the amine functional group of the amine molecule, reducing the potential for the interaction of the amine functional group with the solid surface and increasing amine sites available for $CO_2$ capture.

2. The process of claim 1 wherein the solid material is selected from silica, steel, zeolite, carbon-containing fly-ash, fly-ash, activated carbon, charcoal, carbonaceous material and iron powder.

3. The process of claim 1 wherein the solid material is any solid, low polarity, material.

4. The process of claim 1 wherein the resulting sorbent exhibits at least 2 characteristic IR bands, one at approximately 3282 cm$^{-1}$ and one at approximately 3354 cm$^{-1}$.

5. The process of claim 1 wherein the amine source is a secondary or higher paraffinic or aromatic amine.

6. The process of claim 5 wherein the amine source is a penta-amine.

7. The process of claim 1 wherein the amine source is selected from tetraethylenepentamine and pentaethylenehexaamine.

8. The process of claim 1 wherein the amine source is combined with a solvent.

9. The process of claim 8 wherein the solvent contains an alcohol with one hydroxyl group and an alcohol with multiple hydroxyl groups.

10. The process of claim 8 wherein the solvent is selected from polypol, polyethylene glycol, propanol, butanol, ethanol, monoethanolamine, and diethanolamine.

11. The process of claim 8 wherein the solvent is an alcohol.

12. The process of claim 11 wherein the alcohol has a boiling point below 135° C. and evaporates off prior to $CO_2$ capture.

13. The process of claim 11 wherein the alcohol has a boiling point above 135° C. and remains on the sorbent to increase $CO_2$ capture.

14. The process of claim 1 wherein the amine source is added to the solid material in increments from about 0.5 microns to 5 mL per gram of solid, to allow a solvent component in the amine source to evaporate before adding further amine source for absorption on the material surface.

15. The process of claim 1 wherein the amine source is added to the solid material subsequent to contacting the solid material with $CO_2$ gas.

16. The process of claim 1 wherein the solid material is contacted by the amine source and the $CO_2$ gas simultaneously.

17. The process of claim 1 wherein the amine functional group contains N, NH or $NH_2$ and serves as an amine site.

18. A process for the preparation of a sulfur containing selective absorption material, the process comprising:

providing a solid material;

providing an amine source;

contacting the solid material with the amine source to absorb amine molecules on the surface of the solid material; and contacting the absorbing amine molecules on the solid material surface with a sulfur containing stream such that upon contact with the amine and the solid material, the sulfur containing material binds with the amine functional group of the amine molecule, reducing the potential for the interaction of the amine functional group with the solid surface and increasing amine sites available for the sulfur containing material capture.

19. The process of claim 18 wherein the sulfur containing material is selected from hydrogen sulfide ($H_2S$), carbonyl sulfide (COS), $CS_2$, Thiophene, dibenzothiophene, tetrahydrothiophene (THT), dimethyl sulfide (DMS), mercaptan, tert-butylmercaptan (TBM), 2-methyl-2-propanethiol, 1-propanethiol, isobutanethiol, 2-butanethiol, 1-butanethiol, 1-pentanethiol, 1-hexanethiol, and 1-heptanethiol.

20. A process for the capture and removal of $CO_2$ from a $CO_2$-containing stream the process comprising:

providing a housing having dispersed therein a sorbent selective for $CO_2$;

passing a $CO_2$-containing stream through the housing such that the $CO_2$-containing stream contacts the sorbent;

flushing the housing with steam to cause the sorbent to desorb $CO_2$ retained therein as a result of contact of the sorbent with the $CO_2$-containing stream; and flushing the housing with air to remove the steam from the housing.

21. The process of claim 20 wherein the housing includes the sorbent dispersed therein in the form of at least one of a packed bed, a fluidized bed, dispersed on a metal monolith, or dispersed on a wire or mesh screen.

22. The process of claim 20 wherein the housing is a cylinder, having at least one inlet and at least one outlet, and having a sorbent-carrying wire dispersed therein.

23. The process of claim 22 wherein the sorbent comprises a solid material having dispersed on the surface thereof a $CO_2$-selective absorbing material.

24. The process of claim 23 wherein the solid material is high surface area silica and the $CO_2$-selective material is amine molecules.

25. The process of claim 20 wherein the $CO_2$-containing stream is a waste stream.

26. The process of claim 20 wherein the $CO_2$-containing stream is at a temperature of not higher than 70° C.

27. The process of claim 20 wherein the $CO_2$-containing stream is at a temperature of not higher than 60° C.

28. The process of claim 20 further including passing the desorbed $CO_2$ to a condensing unit that separates the desorbed $CO_2$ and the steam and condenses the steam while purifying the $CO_2$.

* * * * *

UNITED STATES PATENT AND TRADEMARK OFFICE
CERTIFICATE OF CORRECTION

| | | |
|---|---|---|
| PATENT NO. | : 8,377,173 B2 | Page 1 of 1 |
| APPLICATION NO. | : 12/741600 | |
| DATED | : February 19, 2013 | |
| INVENTOR(S) | : Steven Chuang | |

It is certified that error appears in the above-identified patent and that said Letters Patent is hereby corrected as shown below:

In the Specification

Column 1, line 21-23, the following heading and information regarding federally sponsored research is inserted:

-- Statement Regarding Federally Sponsored Research or Development

This invention was made with government support under grant/award DOE-FC26-07NT43086 awarded by the Department of Energy. The government has certain rights in the invention. --

Signed and Sealed this
Second Day of December, 2014

Michelle K. Lee
*Deputy Director of the United States Patent and Trademark Office*